United States Patent
Daniel et al.

(10) Patent No.: US 8,865,828 B2
(45) Date of Patent: Oct. 21, 2014

(54) METHOD FOR PRODUCING PERMEABLE WATER-ABSORBING POLYMER PARTICLES THROUGH POLYMERIZATION OF DROPS OF A MONOMER SOLUTION

(75) Inventors: Thomas Daniel, Waldsee (DE); Uwe Stueven, Bad Soden (DE); Marco Krüger, Mannheim (DE); Stefan Blei, Mannheim (DE); Francisco Javier Lopez Villanueva, Mannheim (DE); Norbert Herfert, Altenstadt (DE)

(73) Assignee: BASF SE, Ludwigshafen (DE)

( * ) Notice: Subject to any disclaimer, the term of this patent is extended or adjusted under 35 U.S.C. 154(b) by 89 days.

(21) Appl. No.: 13/129,823

(22) PCT Filed: Nov. 18, 2009

(86) PCT No.: PCT/EP2009/065381
§ 371 (c)(1),
(2), (4) Date: May 18, 2011

(87) PCT Pub. No.: WO2010/057912
PCT Pub. Date: May 27, 2010

(65) Prior Publication Data
US 2011/0224361 A1  Sep. 15, 2011

Related U.S. Application Data

(60) Provisional application No. 61/116,684, filed on Nov. 21, 2008.

(51) Int. Cl.
*C08F 220/06* (2006.01)
*C08J 3/20* (2006.01)
*C08F 2/01* (2006.01)
*C08F 2/34* (2006.01)
*C08F 6/00* (2006.01)
*C08J 3/12* (2006.01)

(52) U.S. Cl.
CPC ............. *C08F 220/06* (2013.01); *C08J 3/128* (2013.01); *C08J 3/12* (2013.01); *C08J 2333/02* (2013.01)
USPC ........................................... 524/556; 525/55

(58) Field of Classification Search
USPC ........................................... 524/556; 525/55
See application file for complete search history.

(56) References Cited

U.S. PATENT DOCUMENTS

| | | | |
|---|---|---|---|
| 4,020,256 A | 4/1977 | Zweigle et al. | |
| 4,670,524 A | 6/1987 | Messmer et al. | |
| 5,059,664 A | 10/1991 | Yada et al. | |
| 5,731,365 A * | 3/1998 | Engelhardt et al. | 523/206 |
| 6,150,477 A | 11/2000 | Engelhardt et al. | |
| 6,727,345 B2 * | 4/2004 | Kajikawa et al. | 528/502 R |
| 6,849,665 B2 * | 2/2005 | Frenz et al. | 521/64 |
| 7,169,843 B2 * | 1/2007 | Smith et al. | 524/556 |
| 7,727,586 B2 * | 6/2010 | Bruhns et al. | 427/213 |
| 8,596,931 B2 * | 12/2013 | Nagashima et al. | 406/197 |
| 2002/0193546 A1 | 12/2002 | Freeman et al. | |
| 2007/0101644 A1 * | 5/2007 | Fujimaru et al. | 47/58.1 SC |
| 2008/0021130 A1 * | 1/2008 | McIntosh et al. | 523/111 |
| 2009/0192035 A1 | 7/2009 | Stueven et al. | |
| 2009/0239071 A1 | 9/2009 | Stueven et al. | |
| 2009/0258994 A1 | 10/2009 | Stueven et al. | |
| 2010/0035059 A1 | 2/2010 | Losch et al. | |
| 2010/0062932 A1 | 3/2010 | Losch et al. | |
| 2010/0063469 A1 | 3/2010 | Herfert et al. | |
| 2010/0068520 A1 | 3/2010 | Stueven | |
| 2010/0294988 A1 * | 11/2010 | Stueven et al. | 252/194 |

FOREIGN PATENT DOCUMENTS

| | | |
|---|---|---|
| DE | 3519013 A1 | 11/1986 |
| EP | 0 348 180 A2 | 12/1989 |
| EP | 0 816 383 A1 | 1/1998 |
| WO | WO-96/40427 A1 | 12/1996 |
| WO | WO 2006079631 A1 * | 8/2006 |
| WO | WO-2008/009580 A1 | 1/2008 |
| WO | WO-2008/009598 A1 | 1/2008 |
| WO | WO-2008/009599 A1 | 1/2008 |
| WO | WO-2008/009612 A1 | 1/2008 |
| WO | WO-2008025652 A1 | 3/2008 |
| WO | WO-2008/077779 A1 | 7/2008 |
| WO | WO-2008/095892 A1 | 8/2008 |
| WO | WO-2008095901 A1 | 8/2008 |
| WO | WO 2008120742 A1 * | 10/2008 |

OTHER PUBLICATIONS

Buchholz et al., Modern Superabsorbent Polymer Technology, Wiley-VCH, pp. 71-103 (1998).
International Search Report for corresponding International Application No. PCT/EP2009/065381, mailing date Apr. 8, 2010.

* cited by examiner

*Primary Examiner* — Satya Sastri
(74) *Attorney, Agent, or Firm* — Marshall, Gerstein & Borun LLP

(57) ABSTRACT

A process for producing water-absorbing polymer particles by polymerizing droplets of a monomer solution in a surrounding gas phase, wherein the polymer particles are coated with a permeability improver.

22 Claims, No Drawings

METHOD FOR PRODUCING PERMEABLE WATER-ABSORBING POLYMER PARTICLES THROUGH POLYMERIZATION OF DROPS OF A MONOMER SOLUTION

CROSS-REFERENCE TO RELATED APPLICATIONS

This is the U.S. national phase of International Application No. PCT/EP2009/065381, filed Nov. 18, 2009, which claims the benefit of U.S. provisional application No. 61/116,684, filed Nov. 21, 2008, incorporated herein by reference in its entirety.

The present invention relates to a process for producing water-absorbing polymer particles by polymerizing droplets of a monomer solution in a surrounding gas phase, wherein the polymer particles are coated with a permeability improver.

The production of water-absorbing polymer particles is described in the monograph "Modern Superabsorbent Polymer Technology", F. L. Buchholz and A. T. Graham, Wiley-VCH, 1998, pages 71 to 103.

Being products which absorb aqueous solutions, water-absorbing polymers are used to produce diapers, tampons, sanitary napkins and other hygiene articles, but also as water-retaining agents in market gardening. Water-absorbing polymers are also referred to as "superabsorbent polymers" or "superabsorbants".

Spray polymerization allows the process steps of polymerization and drying to be combined. In addition, the particle size can be set within certain limits by a suitable process regime.

The preparation of water-absorbing polymer particles by polymerizing droplets of a monomer solution is described, for example, in EP 0 348 180 A1, EP 0 816 383 A1, WO 96/40427 A1, U.S. Pat. No. 4,020,256, US 2002/0193546 and DE 35 19 013 A1.

WO 2008/009580 A1, WO 2008/009598 A1, WO 2008/009599 A1 and WO 2008/009612 A1 have for their subject matter the production of permeable water-absorbing polymer particles.

WO 2008/095892 A1 and WO 2008/095901 A1 describe processes for reducing the level of unconverted monomers.

It was an object of the present invention to provide an improved process for producing permeable water-absorbing polymer particles by polymerizing droplets of a monomer solution in a gas phase surrounding the droplets.

The object is achieved by a process for producing permeable water-absorbing polymer particles by polymerizing droplets of a monomer solution comprising
a) at least one ethylenically unsaturated monomer which bears acid groups and may be at least partly neutralized,
b) at least one crosslinker,
c) at least one initiator,
d) optionally one or more ethylenically unsaturated monomers copolymerizable with the monomers mentioned under a),
e) optionally one or more water-soluble polymers, and
f) water,
in a surrounding gas phase, the resulting polymer particles being coated with at least one permeability improver and optionally pretreated thermally and/or with steam.

Suitable permeability improvers are inorganic particulate substances, inorganic colloidally dissolved substances, organic polymers, cationic polymers and/or polyvalent cations. Suitable cationic polymers and/or polyvalent cations are, in a preferred embodiment, present before the coating of the polymer particles in the form of water-soluble salts thereof with organic or inorganic anions, and are used in the form of aqueous solutions or dispersions.

Suitable inorganic particulate substances (inorganic particles) are clay minerals such as montmorillonite, kaolinite and talc, water-insoluble sulfates such as strontium sulfate, calcium sulfate and barium sulfate, carbonates such as magnesium carbonate, potassium carbonate and calcium carbonate, salts of polyvalent cations such as aluminum sulfate, aluminum nitrate, aluminum chloride, potassium aluminum sulfate (potassium alum) and sodium aluminum sulfate (sodium alum), magnesium sulfate, magnesium citrate, magnesium lactate, zirconium sulfate, zirconium lactate, iron lactate, iron citrate, calcium acetate, calcium propionate, calcium citrate, calcium lactate, strontium lactate, zinc lactate, zinc sulfate, zinc citrate, aluminum lactate, aluminum acetate, aluminum formate, calcium formate, strontium formate, strontium acetate, oxides such as magnesium oxide, aluminum oxide, zinc oxide, iron(II) oxide, zirconium dioxide and titanium dioxide, water-insoluble phosphates such as magnesium phosphate, strontium phosphate, aluminum phosphate, iron phosphate, zirconium phosphate and calcium phosphate, diatomaceous earth, polysilicic acids, zeolites and activated carbons. Preference is given to using polysilicic acids which, according to the method of preparation, are distinguished between precipitated silicas and fumed silicas. Both variants are commercially available under the names Silica FK, Sipernat®, Wessalon® (precipitated silicas), or Aerosil® (fumed silicas). Also advantageous are colloidal silica solutions, in which the silica particles typically have a diameter of less than 1 µm. Such solutions are also available under the name Levasil®.

However, preference is given to using water-insoluble inorganic particles, for example fumed silica, precipitated silica and water-insoluble metal phosphates. Suitable water-insoluble inorganic particles are described in DE 102 39 074 A1, and suitable water-insoluble metal phosphates in U.S. Pat. No. 6,831,122, both of which explicitly form part of the present disclosure.

In this context "water-insoluble" means a solubility in water at 23° C. of less than 1 g/100 g of water, preferably of less than 0.5 g/100 g of water, more preferably of less than 0.1 g/100 g of water, most preferably of less than 0.05 g/100 g of water. The water-insoluble inorganic particles can be used in the form of a dispersion in an aqueous or water-miscible dispersant or in bulk.

The inorganic particles for use in the process according to the invention are preferably fumed silicas and/or precipitated silicas.

The inorganic particles have a mean particle size of preferably less than 400 µm, more preferably less than 100 µm, most preferably less than 50 µm.

Crystalline inorganic particles preferably have a particle size of greater than 10 µm.

Amorphous inorganic particles have a particle size of preferably at least 1 µm, more preferably at least 3 µm, most preferably at least 7 µm.

When the polymer particles are coated with inorganic particles, the amount used, based on the polymer particles, is preferably from 0.05 to 5% by weight, more preferably from 0.1 to 1.5% by weight, most preferably from 0.3 to 1% by weight.

Suitable organic polymers are all polyfunctional amines with primary or secondary amino groups, such as polyethyleneimine, polyallylamine and polylysine. The organic polymers preferred in the process according to the invention are polyamines, such as polyvinylamine. Particularly suitable organic polymers are N-containing polymers described in DE 102 39 074 A1, which explicitly form part of the present disclosure. In a preferred embodiment, the partly hydrolyzed poly-N-vinylcarboxamides described there are used.

The organic polymers can be used as a solution in an aqueous or water-miscible solvent, as a dispersion in an aqueous or water-miscible dispersant or in bulk.

When the polymer particles are coated with an organic polymer, the amount of organic polymer used, based on the polymer particles, is preferably from 0.1 to 15% by weight, more preferably from 0.5 to 10% by weight, most preferably from 1 to 5% by weight.

Suitable cationic polymers are cationic derivatives of polyacrylamides and polyquaternary amines. The anions of the cationic polymers used are all known organic and inorganic anions, preference being given to chloride, formate, acetate, propionate, malate, tartrate and lactate. The cationic polymers may, however, also be used, for example, in the form of sulfates, phosphates or carbonate, in which case sparingly water-soluble salts may form, which can be used in the form of powders or aqueous dispersions.

Polyquaternary am nes are, for example, condensation products of hexamethylenediamine, dimethylamine and epichlorohydrin, condensation products of dimethylamine and epichlorohydrin, copolymers of hydroxyethylcellulose and diallyldimethylammonium chloride, copolymers of acrylamide and α-methacryloyloxyethyltrimethylammonium chloride, condensation products of hydroxyethylcellulose, epichlorohydrin and trimethylamine, homopolymers of diallyldimethylammonium chloride, and addition products of epichlorohydrin onto amidoamines. In addition, it is possible to obtain polyquaternary amines by reacting dimethyl sulfate with polymers such as polyethyleneimines, copolymers of vinylpyrrolidone and dimethylaminoethyl methacrylate or copolymers of ethyl methacrylate and diethylaminoethyl methacrylate. The polyquaternary amines are available in a wide molecular weight range.

However, it is also possible to obtain the cationic polymers on the particle surface, either by means of reagents which can form a network with themselves, such as addition products of epichlorohydrin onto polyamidoamines, or by applying polymers which can react with an added crosslinker, such as polyamines or polyimines in combination with polyepoxides.

The cationic polymers may be used in the form of a solution in an aqueous or water-miscible solvent, as a dispersion in an aqueous or water-miscible dispersant or in bulk.

When the polymer particles are coated with a cationic polymer, the amount of cationic polymer used, based on the polymer particles, is preferably from 0.1 to 15% by weight, more preferably from 0.5 to 10% by weight, most preferably from 1 to 5% by weight.

Suitable polyvalent cations are, for example, divalent cations such as the cations of zinc, magnesium, calcium, iron and strontium, trivalent cations such as the cations of aluminum, iron, chromium, rare earths and manganese, tetravalent cations such as the cations of titanium and zirconium. Possible counterions are chloride, bromide, sulfate, hydrogensulfate, carbonate, hydrogencarbonate, nitrate, phosphate hydrogenphosphate, dihydrogenphosphate and carboxylate, such as acetate, citrate, tartrate and lactate. Aluminum sulfate, aluminum lactate and zirconium sulfate are preferred. In the presence of different diastereomers, as in the case of tartaric acid, all forms are included and can be used as anions for all polyvalent cations usable in accordance with the invention. The polyvalent cations are preferably used in the form of a solution. The solvents used for the polyvalent cations may be water, alcohols, dimethylformamide, dimethyl sulfoxide and mixtures thereof. Particular preference is given to water and water/alcoho ix ures, such as water/methanol or water/propylene glycol.

Further particularly suitable polyvalent cations are described in WO 2005/080479 A1, which explicitly forms part of the present disclosure. It is also possible to use any desired mixtures of the soluble salts of mono- and polyvalent cations; for example, it is possible to prepare and use a suitable aqueous solution by dissolving lactic acid or alkali metal lactate together with aluminum sulfate. The principle can be generalized to any desired salts of polyvalent cations. It is also possible to use mixtures of different polyvalent cations or any desired mixtures of salts thereof, for example zirconium lactate and aluminum lactate, aluminum lactate and calcium lactate, zirconium lactate and calcium citrate.

Furthermore, it is possible for any desired organic and inorganic salts of monovalent cations, preferably alkali metal salts, organic acids and/or inorganic acids, additionally to be present in the solution with the polyvalent cations. Examples thereof are alkali metal phosphates, alkali metal sulfates, alkali metal hydrogensulfates, alkali metal dihydrogenphosphates, alkali metal hydrogencarbonates, alkali metal hydrogensulfites, and formates, acetates, lactates, propionates, tartrates, citrates, malates of the alkali metals, of ammonium and of triethanolammonium.

When the polymer particles are coated with a polyvalent cation, the amount of polyvalent cation used, based on the polymer particles, is typically at least 0.0001% by weight, preferably from 0.005 to 5% by weight, more preferably from 0.05 to 1.5% by weight, most preferably from 0.1 to 1% by weight.

The permeability improver preferably applied to the polymer particles in mixers with moving mixing tools, such as screw mixers, disk mixers and paddle mixers. Particular preference is given to horizontal mixers such as paddle mixers; very particular preference is given to vertical mixers. The distinction between horizontal mixers and vertical mixers is made by the position of the mixing shaft, i.e. horizontal mixers have a horizontally mounted mixing shaft and vertical mixers a vertically mounted mixing shaft. Suitable mixers are, for example, horizontal Pflugschar® plowshare mixers (Gebr. Lödige Maschinenbau GmbH; Paderborn; Germany), Vrieco-Nauta continuous mixers (Hosokawa Micron By; Doetinchem; the Netherlands), Processall Mixmill mixers (Processall Incorporated; Cincinnati; US) and Schugi Flexomix® (Hosokawa Micron BV; Doetinchem; the Netherlands).

The polymer particles are preferably coated with the permeability improver in a fluidized bed. Suitable processes for this purpose are batchwise and continuous fluidized bed processes, for example by the Wurster or Glatt-Zeller process. In a particularly preferred embodiment, the continuous fluidized bed coating process described in WO 2007/074108 A1 is used, which explicitly forms part of the present disclosure. The process described there is particularly suitable for homogeneous coating with water-soluble and water-insoluble salts, with inorganic mono- and polyvalent cations, and specific coatings, such as the waxes disclosed in DE 195 24 724 A1 and the film-forming polymers disclosed in EP 0 703 265 A1, In a particularly preferred embodiment, the polymer particles are suitable for coating with film-forming polymers by means of the process described in WO 2006/082239 A2, which, including the film-forming polymers described there, forms an explicit part of the present disclosure. The polymer particles used may optionally be surface postcrosslinked beforehand by any known processes, but they are preferably used as obtained in the polymerization, i.e. are not separately surface postcrosslinked in a second reaction step. This is a particular advantage of the process according to the invention. In a further particular embodiment of the process according to the invention, analogously to the process described in WO 2006/082239 A2, coating with film-forming polymers is effected in a fluidized bed, preferably continuously, at a carrier gas temperature of less than 120° C., and the subsequent further procedure is according to WO 2006/082239 A2.

The temperature of the polymer particles before and during the coating is preferably from 40 to 80° C., more preferably from 45 to 75° C., most preferably from 50 to 70° C. In the case of use of aqueous solutions or aqueous dispersions for coating, the polymer particles tend to form lumps. This tendency to form lumps decreases with rising temperature. Higher temperatures lower the moisture content of the polymer particles and thus reduce their mechanical stability.

The moisture content of the polymer particles during the coating is preferably from 5 to 20% by weight, more preferably from 7 to 18% by weight, most preferably from 10 to 16% by weight. The moisture content is typically established via the temperature and residence time of the polymerization. With rising moisture content, the mechanical stability of the polymer particles increases; at too high a moisture content, the polymer particles become tacky.

The present invention is based on the finding that polymerization of droplets of a monomer solution in a surrounding gas phase with subsequent coating with a permeability improver affords water-absorbing polymer particles of high centrifuge retention capacity (CRC) and high saline flow conductivity (SFC) or high gel bed permeability (GBP). Since the process according to the invention dispenses with a covalent surface postcrosslinking before the coating with the permeability improver, the associated adverse lowering of the centrifuge retention capacity (CRC) is avoided.

Advantageously, the polymer particles are pretreated thermally and/or with steam before the coating with the permeability improver. This pretreatment lowers the content of unconverted monomer a) in the polymer particles. Such processes are described in WO 2008/095892 A1 and WO 2008/095901 A1.

In addition, the level of unconverted monomer a) can be reduced by means of monomer scavengers already added to the monomer solution, for example urea and more preferably a salt of urea and an inorganic acid, for example urea phosphate.

It is possible to use any salt of urea with an inorganic acid, including mixtures of such salts. Preference is given to using an inorganic acid which has no reducing properties, i.e. does not reduce any other substances under customary conditions. Preference is also given to using a nonoxidizing acid, i.e. an acid which does not oxidize any other substances under customary conditions. Particularly preferred inorganic acids are especially sulfuric acid, phosphoric acid, polyphosphoric acids, hydrohalic acids, including especially hydrofluoric acid and hydrochloric acid, the latter being preferred among the hydrohalic acids. A very particularly preferred acid is phosphoric acid.

The salt of the urea with an inorganic acid is used in an amount of typically from 0.01 to 5% by weight, preferably from 0.1 to 2.5% by weight, more preferably from 0.2 to 1.5% by weight, most preferably from 0.3 to 1% by weight, based in each case on the polymer particles.

Furthermore, the polymer particles may also, during or after being coated with the permeability improver, additionally be treated with any monomer reducing agents known to those skilled in the art, for example potassium bisulfite, sodium bisulfite, hydroxylamine, sodium thiosulfate or calcium sulfite. The monomer reducing agents are preferably used in the form of an aqueous solution.

The preparation of the typically water-insoluble water-absorbing polymer particles is explained in detail hereinafter.

The monomers a) are preferably water-soluble, i.e. the solubility in water at 23° C. is typically at least 1 g/100 g of water, preferably at least 5 g/100 g of water, more preferably at least 25 g/100 g of water, most preferably at least 35 g/100 g of water.

Suitable monomers a) are, for example, ethylenically unsaturated carboxylic acids, such as acrylic acid, methacrylic acid, maleic acid and itaconic acid. Particularly preferred monomers are acrylic acid and methacrylic acid. Very particular preference is given to acrylic acid.

Further suitable monomers a) are, for example, ethylenically unsaturated sulfonic acids, such as styrenesulfonic acid and 2-acrylamido-2-methylpropanesulfonic acid (AMPS).

Impurities can have a considerable influence on the polymerization. The raw materials used should therefore have a maximum purity. It is therefore often advantageous to specially purify the monomers a). Suitable purification processes are described, for example, in WO 2002/055469 A1, WO 2003/078378 A1 and WO 2004/035514 A1. A suitable monomer a) is, for example, acrylic acid purified according to WO 2004/035514 A1 comprising 99.8460% by weight of acrylic acid, 0.0950% by weight of acetic acid, 0.0332% by weight of water, 0.0203% by weight of propionic acid, 0.0001% by weight of furfurals, 0.0001% by weight of maleic anhydride, 0.0003% by weight of diacrylic acid and 0.0050% by weight of hydroquinone monomethyl ether.

The proportion of acrylic acid and/or salts thereof in the total amount of monomers a) is preferably at least 50 mol %, more preferably at least 90 mol %, most preferably at least 95 mol %.

The acid groups of the monomers a) are typically partly neutralized, preferably to an extent of from 25 to 85 mol %, preferentially to an extent of from 50 to 80 mol %, more preferably to an extent of from 60 to 75 mol %, most preferably from 65 to 72 mol %, for which the customary neutralizing agents can be used, preferably alkali metal hydroxides, alkali metal oxides, alkali metal carbonates or alkali metal hydrogencarbonates, and mixtures thereof. Instead of alkali metal salts, it is also possible to use ammonium salts. Sodium and potassium are particularly preferred as alkali metals, but very particular preference is given to sodium hydroxide, sodium carbonate or sodium hydrogencarbonate and mixtures thereof. Typically, the neutralization is achieved by mixing in the neutralizing agent as an aqueous solution, as a melt, or preferably also as a solid. For example, sodium hydroxide with a water content significantly below 50% by weight may be present as a waxy material with a melting point above 23° C. In this case, metered addition as piece material or a melt at elevated temperature is possible. Optionally, it is possible to add to the monomer solution, or to starting materials thereof, one or more chelating agents for masking metal ions, for example iron, for the purpose of stabilization. Suitable chelating agents are, for example, alkali metal citrates, citric acid, alkali metal tartrates, pentasodium triphosphate, ethylenediamine tetraacetate, nitrilotriacetic acid, and all chelating agents known under the Trilon® name, for example Trilon® C (pentasodium diethylenetriaminepentaacetate), Trilon® D (trisodium (hydroxyethyl)-ethylenediaminetriacetate), and Trilon® M (methylglycinediacetic acid).

The monomers a) typically comprise polymerization inhibitors, preferably hydroquinone monoethers, as storage stabilizers.

The monomer solution comprises preferably up to 250 ppm by weight, preferably at most 130 ppm by weight, more preferably at most 70 ppm by weight, preferably at least 10 ppm by weight, more preferably at least 30 ppm by weight, especially around 50 ppm by weight, of hydroquinone monoether, based in each case on the unneutralized monomer a). For example, the monomer solution can be prepared by using an ethylenically unsaturated monomer bearing acid groups with an appropriate content of hydroquinone monoether. The hydroquinone monoethers may, however, also be removed from the monomer solution by absorption, for example on activated carbon.

Preferred hydroquinone monoethers are hydroquinone monomethyl ether (MEHQ) and/or alpha-tocopherol (vitamin E).

Suitable crosslinkers b) are compounds having at least two groups suitable for crosslinking. Such groups are, for example, ethylenically unsaturated groups which can be polymerized free-radically into the polymer chain, and functional groups which can form covalent bonds with the acid groups of the monomer a). In addition, polyvalent metal salts which can form coordinate bonds with at least two acid groups of the monomer a) are also suitable as crosslinkers b).

Crosslinkers b) are preferably compounds having at least two polymerizable groups which can be polymerized free-radically into the polymer network. Suitable crosslinkers b) are, for example, ethylene glycol dimethacrylate, diethylene glycol diacrylate, polyethylene glycol diacrylate, allyl methacrylate, trimethylolpropane triacrylate, triallylamine, tetraallylammonium chloride, tetraallyloxyethane, as described in EP 0 530 438 A1, di- and triacrylates, as described in EP 0 547 847 A1. EP 0 559 476 A1, EP 0 632 068 A1, WO 93/21237 A1, WO 2003/104299 A1, WO 2003/104300 A1, WO 2003/104301 A1 and DE 103 31 450 A1, mixed acrylates which, as well as acrylate groups, comprise further ethylenically unsaturated groups, as described in DE 103 31 456 A1 and DE 103 55 401 A1, or crosslinker mixtures, as described, for example, in DE 195 43 368 A1, DE 196 46 484 A1, WO 90/15830 A1 and WO 2002/032962 A2.

Preferred crosslinkers b) are pentaerythrityl triallyl ether, tetraalloxyethane, methylenebismethacrylamide, 15 to 30-tuply ethoxylated glyceryl triacrylate, 15 to 30-tuply ethoxylated trimethylolpropane triacrylate, 15 to 20-tuply ethoxylated trimethylolethane triacrylate, 15 to 20-tuply ethoxylated trimethylolpropane triacrylate, polyethylene glycol diacrylate, trimethylolpropane triacrylate and triallylamine.

Very particularly preferred crosslinkers b) are the polyethoxylated and/or -propoxylated glycerols which have been esterified with acrylic acid or methacrylic acid to give di- or triacrylates, as described, for example, in WO 2003/104301 A1. Di- and/or triacrylates of 3- to 10-tuply ethoxylated glycerol are particularly advantageous. Very particular preference is given to di- or triacrylates of 1- to 5-tuply ethoxylated and/or propoxylated glycerol. Most preferred are the triacrylates of 3- to 5-tuply ethoxylated and/or propoxylated glycerol, especially the triacrylate of 3-tuply ethoxylated glycerol.

The amount of crosslinker b) is preferably from 0.01 to 1.5% by weight, more preferably from 0.05 to 1% by weight, most preferably from 0.1 to 0.6% by weight, based in each case on monomer a). With rising crosslinker content, the centrifuge retention capacity (CRC) falls and the absorption under a pressure of 21.0 g/cm$^2$ (AUL0.3 psi) passes through a maximum.

The initiators c) used may be all compounds which disintegrate into free radicals under the polymerization conditions, for example peroxides, hydroperoxides, hydrogen peroxide, persulfates, azo compounds and what are known as redox initiators. Preference is given to the use of water-soluble initiators. In some cases, it is advantageous to use mixtures of various initiators, for example mixtures of hydrogen peroxide and sodium or potassium peroxodisulfate. Mixtures of hydrogen peroxide and sodium peroxodisulfate can be used in any proportion.

Particularly preferred initiators c) are azo initiators such as 2,2'-azobis[2-(2-imidazolin-2-yl)propane] dihydrochloride and 2,2'-azobis[2-(5-methyl-2-imidazolin-2-yl)propane] dihydrochloride, and photoinitiators such as 2-hydroxy-2-methylpropiophenone and 1-[4-(2-hydroxyethoxy)phenyl]-2-hydroxy-2-methyl-1-propan-1-one, redox initiators such as sodium persulfate/hydroxymethylsulfinic acid, ammonium peroxodisulfate/hydroxy-methylsulfinic acid, hydrogen peroxide/hydroxymethylsulfinic acid, sodium persulfate/ascorbic acid, ammonium peroxodisulfate/ascorbic acid and hydrogen peroxide/ascorbic acid, photoinitiators such as 1-[4-(2-hydroxyethoxy)phenyl]-2-hydroxy-2-methyl-1-propan-1-one, and mixtures thereof.

The initiators are used in customary amounts, for example in amounts of from 0.001 to 5% by weight, preferably from 0.01 to 2% by weight, based on the monomers a).

Ethylenically unsaturated monomers d) copolymerizable with the ethylenically unsaturated monomers a) bearing acid groups are, for example, acrylamide, methacrylamide, hydroxyethyl acrylate, hydroxyethyl methacrylate, dimethylaminoethyl methacrylate, dimethylaminoethyl acrylate, dimethylaminopropyl acrylate, diethylaminopropyl acrylate, dimethylaminoethyl methacrylate, diethylaminoethyl methacrylate.

The water-soluble polymers e) used may be polyvinyl alcohol, polyvinylpyrrolidone, starch, starch derivatives, modified cellulose, such as methylcellulose or derivatives and modified cellulose.

The water content of the monomer solution is preferably less than 65% by weight, preferentially less than 62% by weight, more preferably less than 60% by weight, most preferably less than 58% by weight.

The monomer solution has, at 20° C., a dynamic viscosity of preferably from 0.002 to 0.02 Pa·s, more preferably from 0.004 to 0.015 Pa·s, most preferably from 0.005 to 0.01 Pa·s. The mean droplet diameter in the droplet generation rises with rising dynamic viscosity.

The monomer solution has, at 20° C., a density of preferably from 1 to 1.3 g/cm$^3$, more preferably from 1.05 to 1.25 g/cm$^3$, more preferably from 1.1 to 1.2 g/cm$^3$.

The monomer solution has, at 20° C., a surface tension of from 0.02 to 0.06 N/m, more preferably from 0.03 to 0.05 N/m, more preferably from 0.035 to 0.045 N/m. The mean droplet diameter in the droplet generation rises with rising surface tension.

The aqueous monomer solution is metered into a gas phase to form discrete droplets.

In the process according to the invention, it is possible to use one or more spray nozzles. The usable spray nozzles are not subject to any restriction. The liquid to be sprayed can be supplied to such nozzles under pressure. The liquid to be sprayed can be divided by decompressing it in the nozzle bore on attainment of a particular minimum velocity. In addition, it is also possible to use one-substance nozzles for the inventive purpose, for example slot nozzles or swirl chambers (full-cone nozzles) (for example from Düsen-Schlick GmbH, Germany, or from Spraying Systems Deutschland GmbH, Germany).

Preference is given in accordance with the invention to full-cone nozzles. Among these, preference is given to those having an opening angle of the spray cone of from 60 to 180°. Particular preference is given to opening angles of from 90 to 120°. The throughput per spray nozzle is appropriately from 0.1 to 10 m³/h, frequently from 0.5 to 5m³/h.

The reaction can also be carried out in apparatus in which the monomer solution can fall freely in the form of monodisperse droplets. Suitable apparatus for this purpose is as described, for example, in U.S. Pat. No. 5,269,980.

Droplet generation by laminar jet decomposition, as described in Rev. Sci. Instr. 38 (1966) 502, is likewise possible.

The droplets can also be obtained by means of pneuatic draw dies, rotation, cutting of a jet, or rapidly actuable microvalve nozzles, In a pneumatic draw die, a liquid jet together with a gas stream is accelerated through a diaphragm. The amount of gas can be used to influence the diameter of the liquid jet and hence the droplet diameter.

In the case of droplet generation by rotation, the liquid passes through the orifices of a rotating disk. The centrifugal force which acts on the liquid tears off droplets of defined size. Preferred apparatus for rotary dropletization is described, for example, in DE 43 08 842 A1.

However, the emerging liquid jet can also be cut into defined segments by means of a rotating blade. Each segment subsequently forms a droplet.

In the case of use of microvalve nozzles, droplets with defined liquid volume are obtained directly.

In a particularly preferred embodiment of the present invention, the monomer solution is metered into the reaction chamber by means of at least one bore to form droplets. The bores may be present, for example, in a dropletizer plate.

A dropletizer plate is a plate having at least one bore, the liquid entering the bore from the top. The dropletizer plate or the liquid can be oscillated, which generates a chain of ideally monodisperse droplets at each bore on the underside of the dropletizer plate. In a preferred embodiment, the dropletizer plate is not agitated.

The number and size of the bores are selected according to the desired capacity and droplet size. The droplet diameter is typically 1.9 times the diameter of the bore. What is important here is that the liquid to be dropletized does not pass through the bore too rapidly and the pressure drop over the bore is not too great. Otherwise, the liquid is not dropletized, but rather the liquid jet is broken up (sprayed) owing to the high kinetic energy. The Reynolds number based on the throughput per bore and the bore diameter is preferably less than 2000, preferentially less than 1600, more preferably less than 1400 and most preferably less than 1200.

The dropletizer plate has typically at least one bore, preferably at least 10, more preferably at least 50 and typically up to 10 000 bores, preferably up to 5000, more preferably up to 1000 bores, the bores typically being distributed uniformly over the dropletizer plate, preferably in so-called triangular pitch, i.e. three bores in each case form the corners of an equilateral triangle.

The separation of the bores is preferably from 1 to 50 mm, more preferably from 2.5 to 20 mm, most preferably from 5 to 10 mm.

The temperature of the monomer solution as it passes through the bore is preferably from 10 to 60° C., more preferably from 15 to 50° C., most preferably from 20 to 40° C.

A gas flows through the reaction chamber. The carrier gas can be conducted through the reaction chamber in cocurrent or in countercurrent to the free-falling droplets of the monomer solution, preferably in cocurrent, i.e. from the top downward. After one pass, the gas is preferably recycled at least partly, preferably to an extent of at least 50%, more preferably to an extent of at least 75%, into the reaction chamber as cycle gas. Typically, a portion of the carrier gas is discharged after each pass, preferably up to 10%, more preferably up to 3% and most preferably up to 1%.

The oxygen content of the carrier gas is preferably from 0.5 to 15% by volume, more preferably from 1 to 10% by volume, most preferably from 2 to 7% by volume.

As well as oxygen, the carrier gas preferably comprises nitrogen. The nitrogen content of the gas is preferably at least 80% by volume, more preferably at least 90% by volume, most preferably at least 95% by volume.

The gas velocity is preferably adjusted such that the flow in the reaction chamber is directed, for example no convection currents opposed to the general flow direction are present, and is, for example, from 0.01 to 5 m/s, preferably from 0.02 to 4 m/s, more preferably from 0.05 to 3 m/s, most preferably from 0.1 to 2 m/s.

The gas flowing through the reaction chamber is appropriately preheated to the reaction temperature before entry into the reaction chamber.

The gas entrance temperature, i.e. the temperature with which the gas enters the reaction chamber, is preferably from 160 to 250° C., more preferably from 180 to 230° C., most preferably from 190 to 220° C.

Advantageously, the gas entrance temperature is controlled in such a way that the gas exit temperature, i.e. the temperature with which the gas leaves the reaction chamber, is from 100 to 180° C., more preferably from 110 to 160° C., most preferably from 120 to 140° C.

The reaction can be carried out under elevated pressure or under reduced pressure; preference is given to a reduced pressure of up to 100 mbar relative to ambient pressure.

The reaction offgas, i.e. the gas leaving the reaction chamber, may, for example, be cooled in a heat exchanger. This condenses water and unconverted monomer a). The reaction offgas can then be reheated at least partly and recycled into the reaction chamber as cycle gas. A portion of the reaction offgas can be discharged and replaced by fresh gas, in which case water and unconverted monomers a) present in the reaction offgas can be removed and recycled.

Particular preference is given to a thermally integrated system, i.e. a portion of the waste heat in the cooling of the offgas is used to heat the cycle gas.

The reactors can be trace-heated. In this case, the trace heating is adjusted such that the wall temperature is at least 5° C. above the internal reactor temperature and condensation on the reactor walls is reliably prevented.

The coated polymer particles can additionally be coated or remoistened for further improvement of the properties. Suitable coatings for dust binding are, for example, polyols, hyperbranched hydrophilic polymers, for example polyglycerol, and hydrophilic dendrimers. Suitable coatings for counteracting the undesired caking tendency of the polymer particles are, for example, fumed silica, for example Aerosil®, and surfactants, for example Span® (sorbitan monolaurate), Rewoderm® S1333 (disodium ricinoleic monoethanolamidosulfosuccinate), and the surfactants disclosed in WO 2007/074108 A1. Particularly suitable are N-containing surfactants, cationic surfactants and nonionic surfactants. Suitable coatings for improving the color stability (yellowing stability) are, for example, reducing agents such as sodium hypophosphite, sodium sulfite, sodium hydrogensulfite, Brüggolite® FF6 and Brüggolite® FF7 (Brüggemann Chemicals; Heilbronn; Germany).

The present invention further provides water-absorbing polymer particles obtainable by the process according to the invention.

The present invention further provides permeable water-absorbing polymer particles with a centrifuge retention capacity (CRC) of at least 25 g/g, preferably of at least 27 g/g, more preferably of at least 29 g/g, most preferably of at least 30 g/g, and a saline flow conductivity (SFC) which satisfies the condition $$SFC > 79\,000 e^{-0.25\,CRC} + 120/CRC,$$

preferably the condition $$SFC > 79\,000 e^{-0.25\,CRC} + 180/CRC,$$

more preferably the condition $$SFC > 79\,000 e^{-0.25\,CRC} + 240/CRC,$$

or a gel bed permeability (GBP) which satisfies the condition $$GBP > 33\,000 e^{-0.24\,CRC} + 100/CRC$$

preferably the condition $$GBP > 33\,000 e^{0.24\,CRC} + 150/CRC$$

more preferably the condition $$GBP > 33\,000 e^{-0.24\,CRC} + 200/CRC$$

The present invention further provides permeable water-absorbing polymer particles with a centrifuge retention capacity (CRC) of at least 25 g/g, preferably of at least 27 g/g, more preferably of at least 29 g/g, most preferably of at least 30 g/g, a saline flow conductivity (SFC) of at least $20 \times 10^{-7}$ cm$^3$s/g, preferably of at least $30 \times 10^{-7}$ cm$^3$s/g, more preferably of at least $40 \times 10^{-7}$ cm$^3$s/g, most preferably of at least $50 \times 10^{-7}$ cm$^3$s/g, or a gel bed permeability (GBP) of at least 20 darcies, preferably of at least 30 darcies, more preferably of at least 40 darcies, most preferably of at least 50 darcies, and a free swell rate (FSR) of at least 0.35 g/gs, preferably of at least 0.45 g/gs, more preferably of at least 0.4 g/gs, most preferably of at least 0.45 g/gs, or a vortex of less than 50 s, preferably of less than 40 s, more preferably of less than 35 s, most preferably of less than 30 s.

The inventive water-absorbing polymer particles preferably have the shape of partially indented hollow spheres and are approximately spherical, i.e. the polymer particles have a mean sphericity (mSPHT) of typically at least 0.84, preferably at least 0.86, more preferably at least 0.88, most preferably at least 0.9. The sphericity (SPHT) is defined as $$SPHT = \frac{4\pi A}{U^2}$$

where A is the cross-sectional area and U is the cross-sectional circumference of the polymer particles. The mean sphericity (mSPHT) is the volume-average sphericity.

The mean sphericity (mSPHT) can be determined, for example, with the Camsizer® image analysis system (Retsch Technolgy GmbH; Haan; Germany).

Polymer particles with relatively low mean sphericity (mSPHT) are obtained by inverse suspension polymerization when the particles are agglomerated during or after the polymerization.

The water-absorbing polymer particles produced by customary solution polymerization (gel polymerization) are ground and classified after drying to obtain irregular polymer particles. The mean sphericity (mSPHT) of these polymer particles is between approx. 0.72 and approx. 0.78.

The inventive water-absorbing polymer particles have a content of hydrophobic solvent of typically less than 0.005% by weight, preferably less than 0.002% by weight, more preferably less than 0.001% by weight, most preferably less than 0.0005% by weight. The content of hydrophobic solvent can be determined by gas chromatography, for example by means of the headspace technique.

Polymer particles which have been obtained by inverse suspension polymerization still typically comprise approx. 0.01% by weight of the hydrophobic solvent used as the reaction medium.

The mean diameter of the inventive water-absorbing polymer particles is preferably from 300 to 450 μm, more preferably from 320 to 420 μm, very particularly from 340 to 400 μm.

The inventive water-absorbing polymer particles have preferably been coated with inorganic particulate substances, organic polymers, cationic polymers and/or polyvalent cations.

The inventive water-absorbing polymer particles have a moisture content of preferably from 5 to 20% by weight, more preferably from 7 to 18% by weight, most preferably from 10 to 16% by weight.

The inventive water-absorbing polymer particles have a bulk density of typically at least 0.55 g/cm$^3$, preferably at least 0.57 g/cm$^3$, more preferably at least 0.59 g/cm$^3$, most preferably at least 0.6 g/cm$^3$, typically less than 0.75 g/cm$^3$.

The present invention further provides hygiene articles which comprise the inventive water-absorbing polymer particles. For example, the hygiene article may be constructed as follows:

(A) an upper liquid-pervious cover
(B) a lower liquid-impervious layer
(C) an absorbent core between (A) and (B), comprising
    from 10 to 100% by weight of the inventive water-absorbing polymer particles
    from 0 to 90% by weight of hydrophilic fiber material
        preferably from 30 to 100% by weight of the inventive water-absorbing polymer particles, from 0 to 70% by weight of hydrophilic fiber material, more preferably from 50 to 100% by weight of the inventive water-absorbing polymer particles, from 0 to 50% by weight of hydrophilic fiber material,
        especially preferably from 70 to 100% by weight of the inventive water-absorbing polymer particles, from 0 to 30% by weight of hydrophilic fiber material,
        most preferably from 90 to 100% by weight of the inventive water-absorbing polymer particles, from 0 to 10% by weight of hydrophilic fiber material,
(D) optionally a tissue layer disposed immediately above and below the absorbent core (C) and
(E) optionally an acquisition distribution layer disposed between (A) and (C).

Hygiene articles are understood to mean, for example, incontinence pads 6nd incontinence briefs for adults, or diapers for babies.

The water-absorbing polymer particles are tested by means of the test methods described below.

Methods:

The measurements should, unless stated otherwise, be carried out at an ambient temperature of 23±2° C. and a relative air humidity of 50±10%. The water-absorbing polymer particles are mixed thoroughly before the measurement.

Mean Sphericity

The mean sphericity (mSPHT) is determined with the Camsizer® image analysis system (Retsch Technolgy GmbH; Haan; Germany).

Saline Flow Conductivity

The saline flow conductivity (SFC) of a swollen gel layer under a pressure of 0.3 psi (2070 Pa) is, as described in EP 0 640 330 A1, determined as the gel layer permeability of a swollen gel layer of water-absorbing polymer particles, the apparatus described on page 19 and in FIG. 8 in the aforementioned patent application having been modified to the effect that the glass frit (40) is not used, and the plunger (39) consists of the same polymer material as the cylinder (37) and now comprises 21 bores of equal size distributed homogeneously over the entire contact area. The procedure and evaluation of the measure ent remain unchanged from EP 0 640 330 A1. The flow is detected automatically.

The saline flo conductivity (SFC) is ca culated as follows:

$$SFC[cm^3 s/g] = (Fg(t=0) \times L0)/(d \times A \times WP)$$

where Fg(t=0) is the flow of NaCl solution in g/s, which is obtained using linear regression analysis of the Fg(t) data of the flow determinations by extrapolation to t=0, L0 is the thickness of the gel layer in cm, d is the density of the NaCl solution in g/cm$^3$. A is the area of the gel layer in cm$^2$, and WP is the hydrostatic pressure over the gel layer in dyn/cm$^2$.

Free Swell Rate

To determine the free swell rate (FSR), 1.00 g (=$W_1$) of the dry water-absorbing polymer particles is weighed into a 25 ml beaker and distributed homogeneously over its base. Then 20 ml of a 0.9% by weight sodium chloride solution are metered into a second beaker. The contents of this beaker are added rapidly to the first and a stopwatch is started. As soon as the last drop of salt solution has been absorbed, which is recognized by the disappearance of the reflection on the liquid surface, the stopwatch is stopped. The exact amount of liquid which has been poured out of the second beaker and absorbed by the polymer in the first beaker is determined accurately by reweighing the second beaker (=$W_2$). The time interval required for the absorption, which has been measured with the stopwatch, is designated as t.

The free swell rate (FSR) is calculated therefrom as follows:

$$FSR[g/gs] = W_2/(W_1 \times t)$$

Vortex Test 50.0 ml±1.0 ml of a 0.9% by weight aqueous sodium chloride solution are added to a 100 ml beaker which comprises a magnetic stirrer bar of size 30 mm×6 mm. With the aid of a magnetic stirrer, the sodium chloride solution is stirred at 600 rpm. 2.000 g±0.010 g of water-absorbing polymer particles are then added very rapidly, and the time which elapses until the stirring vortex disappears as a result of the absorption of the sodium chloride solution by the water-absorbing polymer particles is measured. At this time, the entire contents of the beaker may still rotate as a homogeneous gel mass, but the surface of the gelated sodium chloride solution must no longer exhibit any individual turbulences. The time required is reported as the vortex.

Free Swell Gel Bed Permeability

The method of determining the gel bed permeability (GBP) is described in US 2005/0256757 A1, paragraphs [0061] to [0075].

Moisture Content

The moisture content of the water-absorbing polymer particles is determined by the EDANA recommended test method No. WSP 230.2-05 "Moisture content".

Centrifuge Retention Capacity

The centrifuge retention capacity (CRC) is determined by the EDANA recommended test method No. WSP 241.2-05 "Centrifuge Retention Capacity".

Extractables

The extractables are determined by the EDANA recommended test method No. WSP 270.2-05 "Extractables". The EDANA test methods are, for example, obtainable from EDANA, Avenue Eugène Plasky 157, B-1030 Brussels, Belgium.

EXAMPLES

Production of the polymer particles

Example 1

A Werner & Pfleiderer LUK 8.0 K2 kneader (2 sigma shafts) was purged with nitrogen and charged with a nitrogen-inertized mixture consisting of 5166 g of a 37.7% by weight aqueous sodium acrylate solution, 574 g of acrylic acid and 720 g of deionized water. Subsequently, from 7.2 to 13.5 g of triethoxylated glyceryl triacrylate (GlyTA), 10 g of a 0.25% by weight aqueous ascorbic acid solution, 16.0 g of a 15% by weight aqueous sodium persulfate solution and 7.5 g of a 3% by weight aqueous hydrogen peroxide solution were added. The kneader was operated with shaft speeds of 98 rpm and 49 rpm. Directly after the addition of the hydrogen peroxide solution, the heating jacket of the kneader was heated to 80° C. A short time later, the monomer solution polymerized and attained, after approx. 5 minutes, a peak temperature of from 80 to 90° C. Thereafter, the heating of the heating jacket was switched off and the gel reacted for another 15 minutes with the kneader shafts running. Subsequently, the resulting polymer gel was dried in a forced-air drying cabinet at 170° C. for 75 minutes. The dried polymer gel was ground three times by means of a roll mill (Gebrüder Baumeister LRC 125/70), with the gap settings of 1000 µm, 600 µm and 400 µm, and then sieved off to a particle size of from 150 to 850 µm.

The resulting polymer particles were analyzed. The results are compiled in table 1.

TABLE 1

| | Polymerization in a kneader | | | | | | |
|---|---|---|---|---|---|---|---|
| Example | GlyTA [g] | CRC [g/g] | Extractables [%] | SFC [10$^{-7}$ cm$^3$s/g] | GBP [darcies] | Moisture content [%] | mSPHT |
| 1-1 | 7.2 | 34.5 | 10.2 | 1 | 1 | 0.5 | 0.74 |
| 1-2 | 9.3 | 32.1 | 9.8 | 1 | 1 | 0.4 | 0.73 |
| 1-3 | 11.2 | 30.6 | 7.6 | 2 | 3 | 0.5 | 0.75 |
| 1-4 | 13.5 | 28.5 | 6.1 | 3 | 5 | 0.3 | 0.74 |

Example 2

1121.2 g of acrylic acid were added to a 4 liter glass reactor which was provided with a lid, a thermometer and an inlet tube for nitrogen, and surrounded by an insulating jacket. Thereafter, 5.6 to 13.5 g of pentaerythrityl triallyl ether (Penta), 2346.9 g of deionized water and 500 g of ice, prepared with deionized water, were added. The monomer solution was inertized with nitrogen for 30 minutes. Then 12.3 g of a 1% by weight aqueous hydrogen peroxide solution and 12.3 g of a 1% by weight aqueous ascorbic acid solution were added simultaneously. The addition was followed by a rapid temperature rise, and the monomer solution became viscous. The nitrogen inlet tube was pulled out of the monomer solution and remained in the gas phase until a peak temperature of from approx. 90 to 95° C. was attained. The resulting polymer gel was left to stand overnight, removed from the glass reactor and comminuted with the aid of an extruder (model 4812; Hobart Corporation, Troy; US). The comminuted polymer gel was admixed with 838.1 g of a 50% by weight sodium hydroxide solution, thoroughly kneaded manually, and extruded twice more. Thereafter, a solution of 10.4 g of sodium bisulfite in 200 g of deionized water was added to the polymer gel. The polymer gel was again kneaded thoroughly manually and extruded twice more. Subsequently, the polymer gel was dried in a forced-air drying cabinet at 150° C. for 90 minutes. The dried polymer gel was ground at 14 000 rpm by means of a hammer mill (model ZM 200; Retsch GmbH; Haan; Germany), and then screened to a particle size of from 150 to 850 μm.

The resulting polymer particles were analyzed. The results are compiled in table 2.

TABLE 2

Polymerization in a glass reactor

| Example | Penta [g] | CRC [g/g] | SFC [$10^{-7}$ cm³s/g] | GBP [darcies] | Extractables [%] | Moisture content [%] | mSPHT |
|---|---|---|---|---|---|---|---|
| 2-1 | 5.6 | 35.1 | 0 | 0 | 4.8 | 1.0 | 0.76 |
| 2-2 | 7.8 | 32.9 | 0 | 1 | 4.5 | 0.9 | 0.76 |
| 2-3 | 10.6 | 30.4 | 1 | 2 | 3.7 | 1.2 | 0.75 |
| 2-4 | 13.4 | 28.8 | 2 | 2 | 3.1 | 0.8 | 0.77 |

Example 3

14.3 kg of aqueous sodium acrylate solution (37.5% by weight solution in deionized water), 1.4 kg of acrylic acid and 350 g of deionized water were mixed with 9.9 to 27.5 g of triethoxylated glyceryl triacrylate (GlyTA). The solution was dropletized into a heated dropletization tower filled with a nitrogen atmosphere (180° C., height 12 m, width 2 m, gas velocity 0.1 m/s in cocurrent). The metering rate of the monomer solution was 32 kg/h; the temperature of the monomer solution was 25° C. The dropletizer plate had 60×200 pm bores. The dropletizer had an internal diameter of 40 mm and an internal height of 2 mm. Upstream of the dropletizer, the initiator was metered into the monomer solution by means of static mixers. The initiator used was a 3% by weight solution of 2,2'-azobis[2-(2-imidazolin-2-yl)propane] dihydrochloride in deionized water. The metering rate of the initiator solution was 2.2 kg/h; the temperature of the initiator solution was 25° C. The mixer and dropletizer were connected directly to one another. The resulting polymer particles were screened to a particle size of from 150 to 850 μm, in order to remove any agglomerates formed.

The resulting polymer particles were analyzed. The results are compiled in table 3.

TABLE 3

Polymerization of droplets in a surroundig gas phase

| Example | GlyTA [g] | CRC [g/g] | SFC [$10^{-7}$ cm³s/g] | GBP [darcies] | Extractables [%] | Moisture content [%] | mSPHT |
|---|---|---|---|---|---|---|---|
| 3-1 | 9.9 | 34.8 | 3 | 2 | 3.1 | 7.6 | 0.92 |
| 3-2 | 15.4 | 32.3 | 6 | 3 | 2.8 | 8.0 | 0.91 |

TABLE 3-continued

Polymerization of droplets in a surroundig gas phase

| Example | GlyTA [g] | CRC [g/g] | SFC [$10^{-7}$ cm³s/g] | GBP [darcies] | Extractables [%] | Moisture content [%] | mSPHT |
|---|---|---|---|---|---|---|---|
| 3-3 | 19.3 | 30.2 | 12 | 5 | 2.3 | 7.2 | 0.90 |
| 3-4 | 27.5 | 28.3 | 20 | 8 | 1.9 | 7.4 | 0.92 |

Coating of the Polymer Particles

Example 4

800 g of polymer particles were heated to 85° C. in a drying cabinet and then added to a Pflugschar® M5 plowshare mixer with a heating jacket (Gebr. Lödige Maschinenbau GmbH, Paderborn, Germany) preheated to 80° C. At 450 rpm of the mixer shaft, 32 g of a 26.8% by weight aqueous aluminum sulfate solution were sprayed onto the polymer particles within 4 minutes. The mixer shaft speed was then reduced to 60 rpm and mixing was continued under these conditions for another 5 minutes. The coated polymer particles were discharged from the mixer and allowed to cool to approx. 23° C., and any agglomerates formed were screened off by means of a screen with a mesh size of 850 μm.

The resulting coated polymer particles were analyzed. The results are compiled in table 4.

TABLE 4

Coating with aluminum sulfate

| Polymer particles used | CRC [g/g] | SFC [$10^{-7}$ cm³s/g] | GBP [darcies] | Vortex [s] | FSR [g/gs] | mSPHT | Moisture content [%] |
|---|---|---|---|---|---|---|---|
| 1-1*) | 33.6 | 2 | 2 | 82 | 0.19 | 0.74 | 0.9 |
| 1-2*) | 31.5 | 3 | 2 | 78 | 0.21 | 0.76 | 1.1 |
| 1-3*) | 30.0 | 3 | 5 | 73 | 0.24 | 0.75 | 0.8 |
| 1-4*) | 28.1 | 6 | 9 | 65 | 0.26 | 0.74 | 0.9 |
| 2-1*) | 34.2 | 1 | 0 | 66 | 0.34 | 0.77 | 2.1 |
| 2-2*) | 31.9 | 3 | 1 | 59 | 0.32 | 0.78 | 2.0 |
| 2-3*) | 29.7 | 4 | 4 | 54 | 0.35 | 0.78 | 1.9 |
| 2-4*) | 28.4 | 7 | 8 | 52 | 0.38 | 0.77 | 1.8 |
| 3-1 | 34.0 | 12 | 16 | 25 | 0.85 | 0.92 | 7.9 |
| 3-2 | 31.8 | 15 | 25 | 31 | 0.66 | 0.91 | 8.2 |
| 3-3 | 29.7 | 21 | 33 | 37 | 0.50 | 0.92 | 7.7 |
| 3-4 | 27.5 | 67 | 68 | 45 | 0.37 | 0.92 | 7.8 |

*)Comparative examples

Example 5

Example 4 was repeated, except that 20 g of a 25.0% by weight aqueous aluminum lactate solution were sprayed on instead of aqueous aluminum sulfate solution.

The resulting coated polymer particles were analyzed. The results are compiled in table 5.

TABLE 5

Coating with aluminum lactate

| Polymer particles used | CRC [g/g] | SFC [$10^{-7}$ cm³s/g] | GBP [darcies] | Vortex [s] | FSR [g/gs] | mSPHT | Moisture content [%] |
|---|---|---|---|---|---|---|---|
| 1-1*) | 34.0 | 2 | 0 | 85 | 0.20 | | 1.2 |
| 1-2*) | 31.6 | 4 | 1 | 75 | 0.22 | | 1.0 |
| 1-3*) | 30.2 | 10 | 3 | 72 | 0.25 | | 0.9 |

TABLE 5-continued

Coating with aluminum lactate

| Polymer particles used | CRC [g/g] | SFC [10⁻⁷ cm³s/g] | GBP [darcies] | Vortex [s] | FSR [g/gs] | Moisture content [%] |
|---|---|---|---|---|---|---|
| 1-4*) | 28.1 | 15 | 5 | 66 | 0.27 | 0.8 |
| 3-1 | 34.3 | 18 | 6 | 27 | 0.80 | 7.8 |
| 3-2 | 31.9 | 32 | 9 | 34 | 0.61 | 8.1 |
| 3-3 | 29.8 | 43 | 12 | 40 | 0.42 | 7.9 |
| 3-4 | 28.0 | 85 | 16 | 46 | 0.37 | 7.6 |

*)Comparative examples

Example 6

Example 4 was repeated, except that 10 g of a 30% by weight aqueous dispersion of calcium phosphate (TCP 130; Rhodia GmbH; Frankfurt am Main; Germany) were sprayed on instead of aqueous aluminum sulfate solution.

The resulting coated polymer particles were analyzed. The results are compiled in table 6.

TABLE 6

Coating the calcium phosphate

| Polymer particles used | CRC [g/g] | SFC [10⁻⁷ cm³s/g] | GBP [darcies] | Vortex [s] | FSR [g/gs] | Moisture content [%] |
|---|---|---|---|---|---|---|
| 2-1*) | 34.8 | 1 | 1 | 72 | 0.23 | 1.6 |
| 2-2*) | 33.0 | 3 | 2 | 63 | 0.25 | 1.8 |
| 2-3*) | 30.2 | 5 | 5 | 59 | 0.33 | 1.7 |
| 2-4*) | 28.9 | 9 | 8 | 57 | 0.33 | 1.5 |
| 3-1 | 34.5 | 13 | 12 | 22 | 0.91 | 7.6 |
| 3-2 | 31.9 | 16 | 22 | 28 | 0.69 | 7.8 |
| 3-3 | 30.0 | 24 | 28 | 35 | 0.53 | 7.5 |
| 3-4 | 28.1 | 58 | 44 | 46 | 0.38 | 7.4 |

*)Comparative examples

Example 7

100 g of polymer particles were added to a PE sample bottle (capacity 500 ml) and admixed with 0.2 to 1.0 g of fumed silica (Sipernat® 50, Evonik Degussa GmbH; Frankfurt am Main; Germany). The bottle contents were mixed intimately with the aid of tumbling mixer (T2C; Willy A. Bachofen AG Maschinenfabrik, Basle; Switzerland) for 15 minutes.

The resulting coated polymer particles were analyzed. The results are compiled in table 7.

TABLE 7

Coating with fumed silica

| Polymer particles used | Sipernat® 50 [g] | CRC [g/g] | SFC [10⁻⁷ cm³s/g] | GBP [darcies] | Vortex [s] | Moisture content [%] |
|---|---|---|---|---|---|---|
| 1-3*) | 0.2 | 30.8 | 3 | 2 | 75 | 0.6 |
| 1-3*) | 0.5 | 30.5 | 4 | 6 | 70 | 0.6 |
| 1-3*) | 1.0 | 30.4 | 7 | 10 | 72 | 0.5 |

TABLE 7-continued

Coating with fumed silica

| Polymer particles used | Sipernat® 50 [g] | CRC [g/g] | SFC [10⁻⁷ cm³s/g] | GBP [darcies] | Vortex [s] | Moisture content [%] |
|---|---|---|---|---|---|---|
| 3-3 | 0.2 | 30.2 | 12 | 16 | 32 | 7.2 |
| 3-3 | 0.5 | 30.5 | 22 | 27 | 34 | 7.0 |
| 3-3 | 1.0 | 30.4 | 32 | 45 | 36 | 7.3 |

*)Comparative examples

Example 8

Example 7 was repeated, except that 0.5 to 1.0 g of aluminum oxide (Aeroxide® Alu C 805; Evonik Degussa GmbH; Frankfurt am Main; Germany) was used instead of fumed silica.

The resulting coated polymer particles were analyzed. The results are compiled in table 8.

TABLE 8

Coating with aluminum oxide

| Polymer particles used | Aeroxide® Alu C 805 [g] | CRC [g/g] | SFC [10⁻⁷ cm³s/g] | GBP [darcies] | Vortex [s] | Moisture content [%] |
|---|---|---|---|---|---|---|
| 2-4*) | 0.5 | 28.6 | 9 | 7 | 58 | 0.8 |
| 2-4*) | 1.0 | 28.9 | 14 | 11 | 53 | 0.9 |
| 3-4 | 0.5 | 28.5 | 72 | 48 | 41 | 7.6 |
| 3-4 | 1.0 | 28.4 | 104 | 72 | 37 | 7.5 |

*)Comparative examples

Example 9

A conical fluidized bed apparatus was initially charged with 1000 g of polymer particles which were fluidized with the aid of nitrogen preheated to 40° C. With the aid of a two-substance nozzle, 60 g of a 20% by weight aqueous solution of zirconium sulfate tetrahydrate were sprayed into the fluidized product from the bottom upward within 6 minutes.

The resulting coated polymer particles were analyzed. The results are compiled in table 9.

TABLE 9

Coating with zirconium sulfate

| Polymer particles used | CRC [g/g] | SFC [10⁻⁷ cm³s/g] | GBP [darcies] | FSR [g/gs] | Moisture content [%] |
|---|---|---|---|---|---|
| 1-3*) | 30.1 | 8 | 10 | 0.28 | 0.2 |
| 1-4*) | 28.0 | 12 | 14 | 0.29 | 0.2 |
| 3-3 | 29.7 | 55 | 58 | 0.50 | 5.2 |
| 3-4 | 27.9 | 93 | 81 | 0.41 | 5.9 |

*)Comparative examples

Example 10

A conical fluidized bed apparatus was initially charged with 1000 g of polymer particles which were fluidized with the aid of nitrogen preheated to 50° C. With the aid of a two-substance nozzle, first 90 g of a mixture consisting of 60 g of deionized water and 30 g of a 30% by weight silica sol dispersion (Levasil® 30; H.C. Starck Silicasol GmbH; Goslar; Germany) were sprayed into the fluidized product from the bottom upward within 8 minutes. Subsequently, the same nozzle was used to spray in 150 g of a mixture of 100 g of deionized water and 50 g of a 20 to 22% by weight aqueous polyvinylamine solution (Lupamin® 9095; mean molecular weight of the polyvinylamine $M_w$=340 000 g/mol; BASF Corporation; Mount Olive; US) within 20 minutes. After the spray application, the product was dried in the fluidized bed for another 3 minutes.

The resulting coated polymer particles were analyzed. The results are compiled in table 10.

TABLE 10

Coating with silica sol and polyvinylamine

| Polymer particles used | CRC [g/g] | SFC [$10^{-7}$ cm³s/g] | GBP [darcies] | Vortex [s] | FSR [g/gs] | Moisture content [%] |
|---|---|---|---|---|---|---|
| 1-2*) | 31.8 | 3 | 10 | 63 | 0.26 | 0.3 |
| 1-4*) | 28.5 | 11 | 22 | 55 | 0.29 | 0.4 |
| 2-2*) | 32.3 | 2 | 9 | 49 | 0.36 | 0.8 |
| 2-4*) | 28.2 | 8 | 18 | 45 | 0.39 | 0.6 |
| 3-2 | 32.5 | 36 | 77 | 15 | 1.12 | 5.8 |
| 3-4 | 28.0 | 53 | 115 | 21 | 1.03 | 6.2 |

*)Comparative examples

The invention claimed is:

1. A process for producing permeable water-absorbing polymer particles by polymerizing droplets of a monomer solution comprising
  a) at least one ethylenically unsaturated monomer which bears an acid group and may be at least partly neutralized,
  b) at least one crosslinker,
  c) at least one initiator,
  d) optionally one or more ethylenically unsaturated monomer copolymerizable with the monomer mentioned under a),
  e) optionally one or more water-soluble polymer, and
  f) water,
  in a surrounding gas phase, the resulting polymer particles being coated with at least one permeability improver comprising an inorganic particulate substance, an inorganic colloidally dissolved substance, and/or a polyvalent cation, and optionally pretreated thermally and/or with steam,
  the permeable water-absorbing polymer particles having a centrifuge retention capacity of at least 27 g/g, a mean sphericity of at least 0.84, a bulk density of at least 0.55 g/cm³, and a saline flow conductivity which satisfies the condition $$SRC > 79\,000e^{-0.25\,CRC} + 120/CRC$$

or a gel bed permeability which satisfies the condition $$GBP > 33\,000e^{-0.24\,CRC} + 200/CRC$$

wherein SFC is saline flow conductivity, GBP is gel bed permeability, and CRC is centrifuge retention capacity.

2. The process according to claim 1, wherein the polymer particles in the course of coating have a temperature of from 40 to 80°C.

3. The process according to claim 1, wherein the coating is performed in a fluidized bed.

4. The process according to claim 1, wherein the polymer particles in the course of coating have a moisture content of at least 5% by weight.

5. Permeable water-absorbing polymer particles having a centrifuge retention capacity of at least 27 g/g, a mean sphericity of at least 0.84, a bulk density of at least 0.55 g/cm³, and a saline flow conductivity which satisfies the condition $$SRC > 79\,000e^{-0.25\,CRC} + 120/CRC$$

or a gel bed permeability which satisfies the condition $$GBP > 33\,000e^{-0.24\,CRC} + 200/CRC$$

wherein SFC is saline flow conductivity, GBP is gel bed permeability and CRC is centrifuge retention capacity wherein the polymer particles are coated with at least one permeability improver comprising an inorganic particulate substance, an inorganic colloidally dissolved substance, and/or a polyvalent cation, and optionally pretreated thermally and/or with steam.

6. Permeable water-absorbing polymer particles having a centrifuge retention capacity of at least 27 g/g, a mean sphericity of at least 0.84, a bulk density of at least 0.55 g/cm³, a saline flow conductivity of at least 20 ×$10^{-7}$ cm³s/g or a gel bed permeability of at least 20 darcies, and a free swell rate of at least 0.35 g/gs or a vortex of less than 50 s wherein the polymer particles are coated with at least one permeability improver comprising an inorganic particulate substance, an inorganic colloidally dissolved substance, and/or a polyvalent cation, and optionally pretreated thermally and/or with steam.

7. Polymer particles according to claim 5, which have a mean diameter of at least 300 μm.

8. Polymer particles according to claim 5, which have been coated with an inorganic particulate substance, and/or a polyvalent cation.

9. Polymer particles according to claim 5, which have a moisture content of at least 5% by weight.

10. A hygiene article comprising polymer particles according to claim 5.

11. Polymer particles according to claim 6, which have a mean diameter of at least 300 μm.

12. Polymer particles according to claim 6, which have been coated with an inorganic particulate substance and/or a polyvalent cation.

13. Polymer particles according to claim 6, which have a moisture content of at least 5% by weight.

14. A hygiene article comprising polymer particles according to claim 6.

15. A process for producing permeable water-absorbing polymer particles by polymerizing droplets of a monomer solution comprising
  a) at least one ethylenically unsaturated monomer which bears an acid group and may be at least partly neutralized,
  b) at least one crosslinker,
  c) at least one initiator,
  d) optionally one or more ethylenically unsaturated monomer copolymerizable with the monomer mentioned under a),
  e) optionally one or more water-soluble polymer, and
  f) water,
  in a surrounding gas phase, the resulting polymer particles being coated with at least one permeability improver comprising an inorganic particulate substance, an inorganic colloidally dissolved substance, and/or a polyvalent cation, and optionally pretreated thermally and/or with steam, the permeable water-absorbing polymer particles having a centrifuge retention capacity of at least 27 g/g, a mean sphericity of at least 0.84, a bulk density of at least 0.55 g/cm$^3$, a saline flow conductivity of at least 20 × 10$^{-7}$cm$^3$s/g or a gel bed permeability of at least 20 darcies, and a free swell rate of at least 0.35 g/gs or a vortex of less than 50 s.

16. The process of claim 1 wherein the permeability improver is selected from the group consisting of aluminum sulfate, aluminum lactate, calcium phosphate, fumed silica, aluminum oxide, zirconium sulfate, and a silica sol dispersion.

17. Polymer particles according to claim 8 coated with at least one permeability improver selected from the group consisting of aluminum sulfate, aluminum lactate, calcium phosphate, fumed silica, aluminum oxide, zirconium sulfate, and a silica sol dispersion.

18. Polymer particles according to claim 12 coated with at least one permeability improver selected from the group consisting of aluminum sulfate, aluminum lactate, calcium phosphate, fumed silica, aluminum oxide, zirconium sulfate, and a silica sol dispersion.

19. The process of claim 1 wherein the polymer particles are coated with 0.05% to 5%, by weight, of the at least one permeability improver.

20. The process of claim 19 wherein the polymer particles are coated with 0.1% to 1.5%, by weight, of the at least one permeability improver.

21. The process of claim 15 wherein the polymer particles are coated with 0.05% to 5%, by weight, of the at least one permeability improver.

22. The process of claim 21 wherein the polymer particles are coated with 0.1% to 1.5%, by weight, of the at least one permeability improver.

* * * * *

UNITED STATES PATENT AND TRADEMARK OFFICE
CERTIFICATE OF CORRECTION

PATENT NO. : 8,865,828 B2  
APPLICATION NO. : 13/129823  
DATED : October 21, 2014  
INVENTOR(S) : Thomas Daniel et al.

Page 1 of 1

It is certified that error appears in the above-identified patent and that said Letters Patent is hereby corrected as shown below:

In the Claims:

At Column 19, line 56,
"SRC > 79 000 $e^{-0.25\ CRC}$ + 120/CRC" should be
--SFC > 79 000 $e^{-0.25\ CRC}$ + 120/CRC--.

At Column 20, lines 8-9,
"SRC > 79 000 $e^{-0.25\ CRC}$ + 120/CRC" should be
--SFC > 79 000 $e^{-0.25\ CRC}$ + 120/CRC--.

Signed and Sealed this  
Thirteenth Day of October, 2015

Michelle K. Lee  
*Director of the United States Patent and Trademark Office*